United States Patent [19]

Novotny et al.

[11] Patent Number: 4,824,260

[45] Date of Patent: Apr. 25, 1989

[54] BRAKE BLOCK TEMPERATURE AND WEAR MEASURING DEVICE

[75] Inventors: Raymond J. Novotny, Spartan; Robert B. McCune, Allendale, both of N.J.

[73] Assignee: Abex Corporation, Boston, Mass.

[21] Appl. No.: 181,179

[22] Filed: Apr. 13, 1988

[51] Int. Cl.[4] .................. G01K 1/14; G01K 7/02; F16D 66/00

[52] U.S. Cl. ..................... 374/179; 374/153; 374/116; 340/449; 340/453; 188/1.11

[58] Field of Search ............. 188/1.11; 340/52 B, 340/52 A; 374/153, 179, 115, 116; 136/225, 230

[56] References Cited

U.S. PATENT DOCUMENTS

| | | | |
|---|---|---|---|
| 1,907,540 | 5/1933 | Hebler | 374/153 |
| 2,117,027 | 5/1938 | Langbein | 188/1.11 |
| 2,494,269 | 1/1950 | Sparkes | 188/1.11 |
| 3,689,880 | 9/1972 | McKee et al. | 188/1.11 |
| 3,805,228 | 4/1974 | Peeples | 340/52 A |
| 3,958,445 | 5/1976 | Howard et al. | 188/1.11 |
| 4,188,613 | 2/1980 | Yang et al. | 188/1.11 |
| 4,241,603 | 12/1980 | Hau et al. | 188/1.11 |
| 4,646,001 | 2/1987 | Baldwin et al. | 188/1.11 |
| 4,649,370 | 3/1987 | Thomason | 188/1.11 |
| 4,658,936 | 4/1987 | Moseley | 188/1.11 |

FOREIGN PATENT DOCUMENTS

| | | | |
|---|---|---|---|
| 3502053 | 7/1986 | Fed. Rep. of Germany | 188/1.11 |
| 2574508 | 6/1986 | France | 188/1.11 |
| 0187122 | 10/1984 | Japan | 188/1.11 |
| 0943050 | 7/1982 | U.S.S.R. | 188/1.11 |
| 1085871 | 4/1984 | U.S.S.R. | 188/1.11 |
| 1603741 | 11/1981 | United Kingdom | 188/1.11 |

Primary Examiner—William A. Cuchlinski, Jr.
Assistant Examiner—Thomas B. Will
Attorney, Agent, or Firm—Thomas S. Baker, Jr.

[57] ABSTRACT

A thermocouple for use with a brake block outputs a signal indicative alternatively of the steady state temperature of the brake block friction element and of the transient temperature of the friction element brake drum interface.

35 Claims, 2 Drawing Sheets

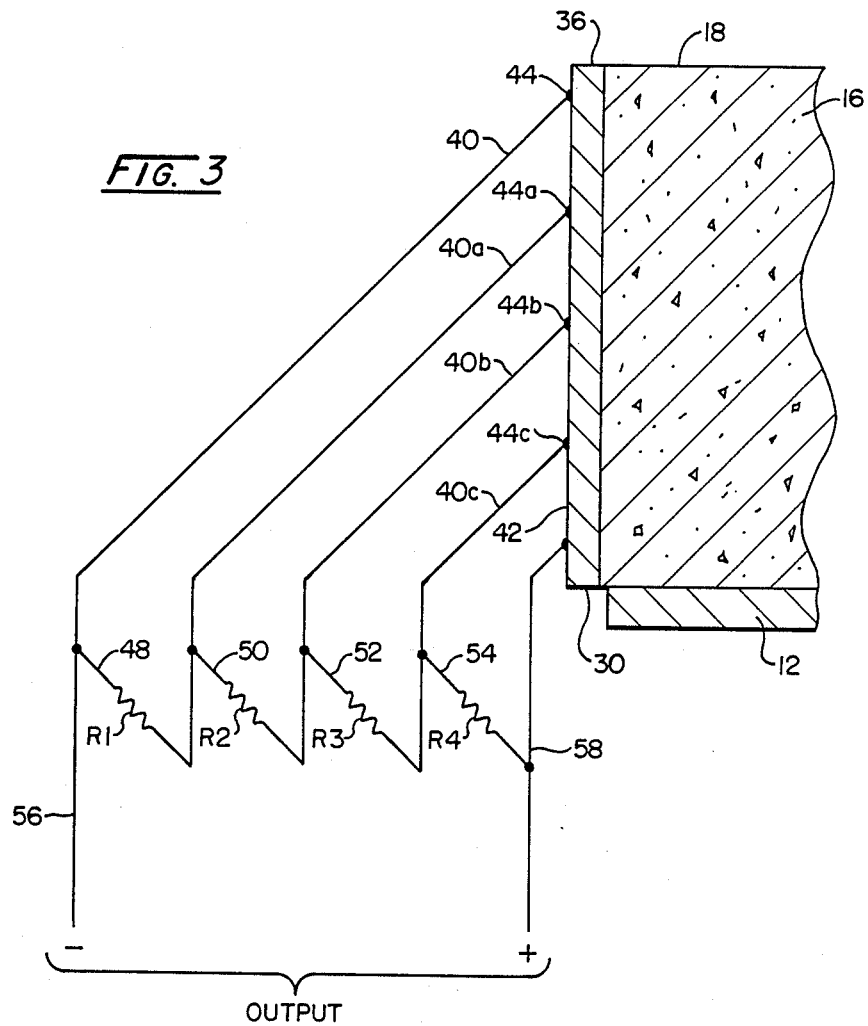

BRAKE BLOCK TEMPERATURE AND WEAR MEASURING DEVICE

BACKGROUND OF THE INVENTION

As wheeled vehicles such as trucks have increased in size, weight and load carrying capacity it has become increasingly important for the vehicle driver to have knowledge of the effectiveness of the brake members during the braking process and of the state of readiness of the braking components particularly in terms of temperature and wear at all times. In a typical vehicle braking system some type of friction element such as a brakeshoe in a drum brake system or a brake pad in a disc brake system is adapted to be moved against a rotating brake drum or disc brake rotor during the braking process. It should be noted that the subject invention is applicable equally to drum brake systems or to disc brake systems. Accordingly, for convenience and to avoid unnecessary repetition this description will refer to drum brake shoes and disc brake pads collectively as brake blocks and will refer to brake drums and rotors collectively as brake drums. In braking systems it has been determined that one indication of the effectiveness of the braking system during the braking process is the temperature at the interface of the brake block friction face and the brake drum friction surface during the braking application. Additionally, it has been determined that the readiness of the braking system may be determined by the thickness of the friction material in the brakeblock and by the steady state temperature of the friction material when the brakes are not being applied.

A major problem in attempting to ascertain the temperature at the brake block-brake drum interface resides in the fact that the temperature at spaced discrete points across the width of the friction material face varies considerably during the braking operation. Such a fact has been confirmed by placing the junctions of thermocouples at spaced points across the face of the friction material of a brake block. Because the temperature indications vary so extensively the information provided by conventional thermocouples at the interface have been relatively useless. In analyzing the braking components during the braking process it has been found that the face of the brake block friction material does not always contact the brake drum uniformly across the width of the friction face because of thermally induced distortion of the brake drum friction surface and because of uneven wear of the brake block friction surface. Consequently, it has become necessary to provide a temperature measuring device for use at the interface of a brake block and a brake drum which will provide an accurate indication of interface temperature despite thermal distortion of the brake drum and uneven wear of the friction element surface.

The subject invention provides a junction type thermal measuring device adapted to be affixed to the friction element of a brake block having one element that extends across a substantial portion of the brake block width and includes a working face that contacts a brake drum friction surface across a substantial portion of its width such that the device acts like an infinite number of thermocouples which are constantly monitoring the interface temperature between the brake block and the brake drum.

SUMMARY OF THE INVENTION

This invention relates to a thermocouple for use with a brake block having a friction element with a friction face adapted to be moved into contact with the braking face of a brake drum and for outputting a signal indicative alternatively of the steady state temperature of the brake block friction element and of the transient temperature of the friction element-brake drum interface. The thermocouple comprises an erodible metallic plate forming one element of the junction of the thermocouple affixed to the brake block. The plate has the same approximate depth as the friction element and has a working face parallel with the friction element friction face. The working face of the metallic plate is adapted to engage the brake drum braking face when the brake block friction element is moved into contact with the brake drum such that the plate erodes with the friction element in a direction perpendicular to the interface. The metallic plate also has a width substantially greater than its thickness and sufficient to ensure that a substantial portion of the working face engages the brake drum working face when the friction element is moved into contact with the brake drum as a result the plate senses the average interface temperature across the drum width due to its high thermal conductivity. The thermocouple also includes at least one alloy lead affixed to the plate to form the second element of the thermocouple junction. However, regardless of the number of leads affixed to the metallic plate only two output leads are required to determine the brake block friction material interface temperature and friction element wear status.

DESCRIPTION OF THE DRAWINGS

FIG. 3 is a partial sectional view of a portion of the friction material of a brake block having the brake block temperature and wear measuring device of the present invention illustrating the circuit for determining the wear of the friction material.

DESCRIPTION OF THE PREFERRED EMBODIMENT

Figure 1:
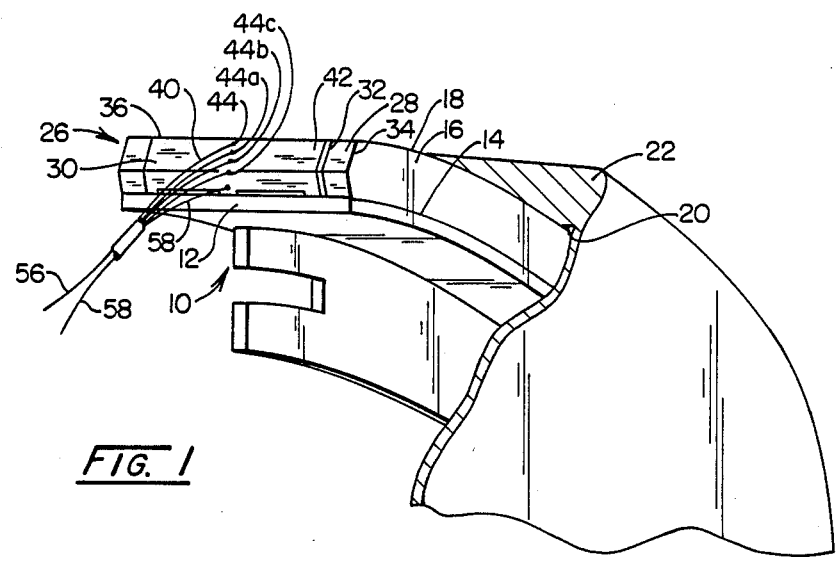
FIG. 1 is a prospective view illustrating the brake block temperature and wear measuring device of the present invention utilized in conjunction with a brake shoe in a drum brake system.

Referring to FIG. 1 of the drawings, it may be seen that a brake block (10) includes an arcuate, metal backplate (12) having an outer surface (14) which rigidly mounts a complementary, arcuate shaped friction element (16). The friction element (16) may be bonded to the outer surface (14) of backplate (12) by an adhesive or may be mechanically affixed thereto by rivets. Friction element (16) includes an arcuate friction face (18)

which is adapted to be moved into contact with a complementary shaped inner friction surface (20) of a brake drum (22) during the braking process. In a conventional drum type brake apparatus a vehicle wheel not shown is rigidly affixed to the brake drum (22) and the two elements rotate together. Braking of the vehicle wheel occurs when a brake actuator causes the brake block (10) to be moved radially outwardly such that the friction face (18) of friction element (16) engages the friction surface (20) of brake drum (22).

The brake block temperature and wear measuring device (26) of the present invention is adapted to be affixed to one lateral side (28) of the brake block friction element (16). Preferably the device is at fixed to a lateral side of the friction element which extends in a direction perpendicular to the direction of rotation of brake drum (22) relative to brake block (10). The temperature and wear measuring device (26) includes a relatively thin plate (30) having a high thermal conductivity. To ensure good thermal conductivity between friction element (16) and plate (30) the plate must be rigidly affixed to the side (28) of the friction element. It may be affixed mechanically as by screws, it may be bonded utilizing adhesives or it may be molded into the friction material. Where the plate is to be molded into the material it has been found preferable to make the plate (30) by stamping and forming laterally projecting protrusions on the plate that project into and are surrounded by the friction material (16) to thereby anchor the plate (30) to the friction material (16).

It has been found advantageous to construct plate (30) out of a copper material having a thickness of less than approximately 0.100 inches. It may be seen that plate (30) has a depth along side (32) that approximately equals the thickness of friction element (16) along side (34). Furthermore, plate (30) includes a working face (36) which is parallel with the friction face (18) of friction element (16). Although in the preferred embodiment plate 30 substantially overlies one side (28) of friction element (16) such that the working face (36) extends laterally approximately the entire width of lateral side (28) it has been found that the subject device (26) will provide accurate temperature and wear measurement indications so long as the width of plate (30) is made substantially greater than its thickness. The advantage to making the plate (30) and working face (36) as wide as possible is to ensure that the major portion of the working face (36) contacts with the friction surface (20) of brake drum (22) during the braking operation regardless of thermal distortion of the brake drum or of irregular wear of the face (18) of friction element (16). Because a substantial portion of working face (36) remains in contact with friction surface (20) at all times during the braking operation, plate (30) rapidly attains and maintains a temperature substantially the same as that of friction surface (20) which represents the interface temperature between that surface and friction face (18) of friction element (16). Moreover, as the friction face (18) of element (16) erodes due to wear the working face (36) of plate (30) also erodes at the same rate. Consequently, the working face (36) maintains a shape which compliments the opposing friction surface (20) of brake drum (22) during the braking operation which ensures that working face (36) contacts substantially the entire friction surface at all times.

From the above it may be observed that the working face (36) of plate (30) rubs the friction surface (20) of brake drum (22) to thereby absorb the heat created at the friction element brake drum interface and cause the metallic plate (30) to attain that temperature. Furthermore, because working face (36) rubs a substantial portion of the friction surface (20) plate (30) attains an average or composite interface temperature as opposed to a localized temperature which would be obtained if only a single contact point on friction surface (20) were being contacted.

In the present invention copper plate (30) forms the positive material of a bi-metallic thermocouple. The temperature and wear measuring device (26) includes a plurality of alloy leads (40)–(40c) which may be seen best by referring to FIG. 3. Leads 40 through 40c preferably are constructed of constantan and are joined to the outer surface (42) of copper plate (30) to form a plurality of thermocouple junctions (44) through (44c) at spaced perpendicular distances from the working face (36). It may be apparent that each thermocouple junction (44)–(44c) will respond to the temperature of the plate (30) at that point and provide an output voltage representative of the temperature at the junction. Because the copper plate (30) has the characteristic of being an excellent thermal conductor it has been found that the temperature at each of the thermocouple junctions (44) through (44c) has the same approximate value. However, the reasons for having more than one constant an lead (40) through (40c) are twofold. The first reason resides in the fact that desirably the thermocouple junction should be as close as possible to the brake block friction material interface as the greatest temperature will occur at this point. Also the measuring device must be able to accommodate wear of the friction element (16). To this end as the friction face (18) of friction element (16) and the working face (36) of plate (30) erode due to wear the thermocouple junctions (44) through (44c) erode in a similar manner. Consequently the thermocouple junctions (44) through (44c) will be destroyed sequentially. Thus, a plurality of thermocouple leads (40)–(40c) are necessary to ensure that an active thermocouple junction (44)–(44c) remains in close proximity with the brake blocks brake drum interface at all times despite wear of the friction element.

In addition to providing an output voltage representative of the temperature of the brake block brake drum interface during braking, copper plate (30) maintains a steady state temperature equal to that of the friction element (16) when the braking operation is not occurring. Consequently, the brake block temperature and wear measuring device (26) also provides an indication of the readiness of the brake system by providing the steady state temperature of the brake block (10).

Referring again to FIG. 3, it may be observed that a plurality of resistors (R1)–(R4) each of which may have a value of approximately 1000 ohms and which preferably are of equal value are connected in serial fashion across the constantan leads (40)-(40c) of the temperature and wear measuring device 26. Line (48) containing resistor (R1) connects leads (40) and (40a), line (50) containing resistor (R2) connects leads (40a) and (40b), line 52 containing resistor (R3) connects leads (40b) and (40c) and line 54 containing resistor (R4) connects leads (40c) and line (58). With this arrangement the interface temperature which is monitored always by the thermocouple closest to the brake block friction material interface and the steady state temperature of friction material (16) may be ascertained by measuring the voltage output across line (58) connected directly to copper plate (30) and the leads (40) through (40c) connected to thermocouple junctions (44) through (44c) respectively. This is true because the output voltage generated by the thermocouple closest to the brake block friction material interface prevails and is due to the low source resistance of this junction compared to the higher source resistance of the other junction when viewed through the termination resistances. Additionally, to determine state of brake block wear, if a voltage is applied across line 56 connected to lead 40 and line 58 the resulting current will provide an indication as to which thermocouple junctions (44) through (44c) are active and which are eroded. With this information the amount of wear of the friction material (16) may be ascertained. For example, if thermocouple junctions (44) and (44a) are eroded a voltage applied across lines (56) and (58) will cause current to flow through line (48), resistor (R1), lead (40a), line (50), resistor (R2), lead (40b), thermocouple junction (44b), copper plate (30), and line 58. The resulting current will provide an indication as to what resistors are in the circuit and from that it may be determined what thermocouple junctions (44)-(44c) remain active. Based upon which of the thermocouple junctions 44-44c are active, i.e., not eroded, the amount of wear of the friction element 16 may be ascertained.

Figure 2:
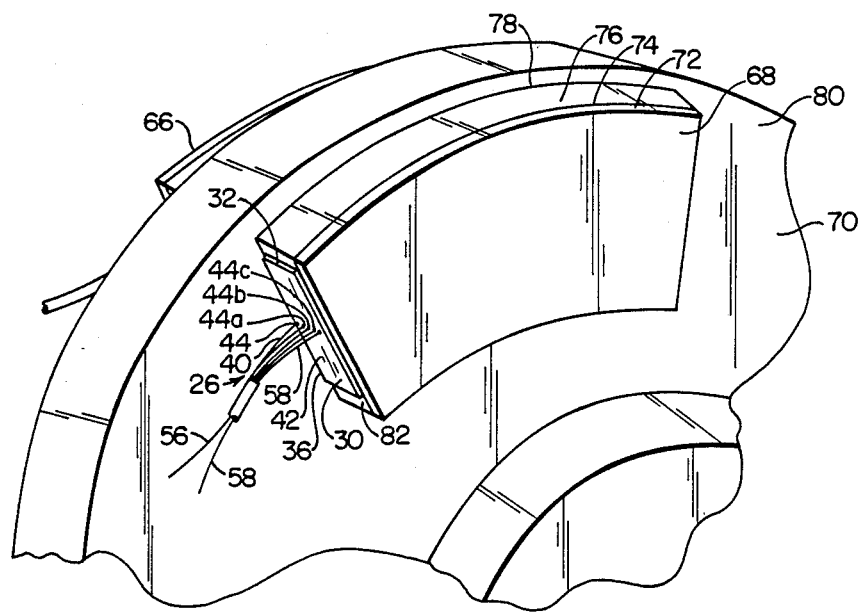
FIG. 2 is a prospective view illustrating the brake block temperature and wear measuring device of the present invention utilized in conjunction with a disc brake pad in a disc brake system.

As mentioned above, the brake block temperature and wear measuring device (26) of the present invention may be utilized in conjunction with the disc brake pad of a disc brake system in the same way as it may be utilized in conjunction with a drum brake block. In fact, no alterations have to be made to the measuring device in order for it to be applied to the brake pad of a disc brake system. Turning to FIG. 2, the brake block temperature and wear measuring device (26) of the present invention may be seen applied to a pair of disc brake pads of the type utilized in a disc brake system. In FIG. 2 a pair of disc brake pads (66) and (68) are illustrated in conjunction with a disc brake rotor (70). In a typical system the disc brake pads (66) and (68) would be mounted in a disc brake caliper, not shown, which overlies a portion of the rotor and which acts to clamp the pads against the rotor during the braking operation. Because the disc brake pads (66) and (68) are identical this description will refer to the application of a brake block temperature and wear measuring device (26) utilized in conjunction with disc brake pad (68). Pad (68) includes a backplate (72) preferably constructed of metal having a front surface (74) which mounts a friction element (76). Friction element (76) may be affixed to the front surface (74) by adhesives or may be mechanically attached to backplate (72) by fasteners such as rivets. Friction element (76) includes a relatively flat friction surface (78) which is adapted to be moved against a complementary flat friction surface (80) formed on one side of rotor (70). During the braking operation the disc brake pads (66) and (68) are biased towards each other to clamp rotor (70) there between.

In applying the measuring device (26) of the present invention to the disc brake pad (68), the metal plate (30) is rigidly affixed to one end (82) of friction element (76). As in the case of the brake block (10), the metallic copper plate may be mechanically affixed to friction element (76) by fasteners such as screws, may be bonded to the end (82) of friction element (76) utilizing adhesives or it may be molded into the friction element (76). Again, where the plate (30) is molded into the friction element (76) it has been found desirable to manufacture the metallic plate as a stamping and form lateral protrusions which may project into the friction material and serve as anchoring devices.

It may be observed that the depth of the plate (30) as measured along side (32) approximately equals the thickness of the friction element (76). In a disc brake system, the working face (36) of the plate (30) is aligned parallel with the friction surface (78) of friction element (76) and is adapted to engage the friction surface (80) of rotor (70) during the braking operation. Consequently, working face (36) quickly attains the temperature of the interface between the friction surfaces (78) and (80) of the brake pad (68) and rotor (70). Additionally, the working face (36) erodes at the same rate as the surface (78) of the friction element and remains complementary with the friction surface (80) of rotor (70).

Also, as in the case of the brake block (10), it has been found that the subject measuring device (26) will provide accurate temperature and wear measurement indications so long as the width of the working face (36) has been made substantially greater than the thickness of the plate (30) which typically will be somewhat less than 0.100 inches. With this construction, the major portion of the working face (36) will be in contact with the friction surface (80) of the rotor (70) during the braking operation regardless of thermal distortion of the rotor (70) or due to irregular wear of the surface (78) of friction element (76).

From the above it may be apparent that the working face (36) of plate (30) scrapes the friction surface (80) of rotor (70) to absorb the heat created at the interface between friction surfaces (78) and (80) to cause the plate (30) to attain that temperature so as to enable the temperature and wear measuring device (26) to output a voltage representative of the brake pad rotor interface temperature during braking.

As mentioned above in connection with utilization of the measuring device (26) with a brake block (10), the copper plate (30) also forms the positive material of a bi-metallic thermocouple when utilized with the disc brake pad (68). Furthermore, the alloy leads (40)-(40c) which preferably are constructed of constantan are joined to the outer surface (42) of the plate to form the thermocouple junctions (44)-(44c) discussed above.

In addition to providing an output voltage representative of the temperature of the brake pad rotor interface during braking, the copper plate (30) maintains a steady state temperature equal to that of the friction element when the brake pads (66) and (68) are not being clamped against the rotor (70). Consequently, the brake pad temperature and wear measuring device (26) also provides an indication of the steady state temperature of the brake pad (68).

It should be apparent, the wear of the disc brake pad friction element (76) may be determined utilizing the same method as described in connection with the description of FIG. 3. From the above, it may be seen that the brake block temperature and wear measuring device (26) of the present invention may be utilized without modification in conjunction with either a drum brake block or a disc brake pad to provide an indication of the interface temperature between the friction element of the brake block or the disc brake pad and the respective friction surface of a brake drum or a rotor as well as the steady state temperature of the friction elements contained in a brake block and a brake pad. Furthermore, the device may be utilized to provide an indication of the wear of a fiction element in either a brake block and a brake pad.

Since certain changes may be made to the above described apparatus, system and method without departing from the scope of the invention herein, it is intended that all matter contained in the description thereof or shown in the accompanying drawings shall be interpreted as illustrative and not in a limiting sense.

We claim:

1. A thermocouple for use with a brake block having a friction element with a friction face adapted to be moved into contact with a braking face of a brake drum and for outputting a signal indicative alternatively of the steady state temperature of the brake block friction element and of the transient temperature of the friction element-brake drum interface which comprises:
   an erodible metallic plate forming one element of a junction of the thermocouple affixed to said brake block;
   said plate having the same approximate depth as said friction element and having a working face parallel with said friction element friction face;
   wherein said working face is adapted to engage said brake drum braking face when said brake block friction element is moved into contact with said brake drum such that said metallic plate erodes with said friction element in a direction perpendicular to said interface;
   said plate having a width substantially greater than its thickness and sufficient to ensure that a substantial portion of said working face engages said brake drum braking face when said friction element is moved into contact with said brake drum; and
   at least one alloy lead affixed to said plate to form the second element of said thermocouple junction.

2. The thermocouple of claim 1, in which a plurality of alloy leads are affixed to said plate at spaced perpendicular distances from said working face to form a plurality of thermocouple junctions such that said plurality of junctions are sequentially destroyed as said plate erodes through contact with said braking face.

3. The thermocouple of claim 2, in which a resistance is interposed between each of said alloy leads to provide an output current indicating the surviving thermocouple junction closest to the working face in response to a voltage applied across said plate and the thermocouple leads.

4. The thermocouple of claim 1, in which said erodible metallic plate is constructed of copper.

5. The thermocouple of claim 1, in which said alloy lead is constantan.

6. The thermocouple of claim 1, in which said metallic plate has a thickness of less than 0.100 inches.

7. The thermocouple of claim 3, in which the transmission of temperature and wear signals is conducted over a common pair of leads.

8. A brake block having a friction element with a friction face adapted to be moved into contact with a braking face of a brake drum and an integral thermocouple for outputting a signal indicative alternatively of the steady state temperature of the brake block friction element and of the transient temperature of the friction element-brake drum interface which comprises;
   an erodible metallic plate forming one element of a junction of the thermocouple affixed to said brake block;
   said plate having the same approximate depth as said friction element and having a working face parallel with said friction element friction face;
   wherein said working face is adapted to engage said brake drum braking face when said brake block friction element is moved into contact with said brake drum such that said metallic plate erodes with said friction element in a direction perpendicular to said interface;
   said plate having a width substantially greater than its thickness and sufficient to ensure that a substantial portion of said working face engages said brake drum braking face when said friction element is moved into contact with said brake drum; and
   at least one alloy lead affixed to said plate to form the second element of said thermocouple junction.

9. The brake block of claim 8, in which a plurality of alloy leads are affixed to said plate at spaced perpendicular distances from said working face to form a plurality of thermocouple junctions such that said plurality of junctions are destroyed sequentially as said plate erodes through contact with said braking face.

10. The brake block of claim 9, in which a resistance is interposed between each of said alloy leads to provide an output current indicating the surviving thermocouple junction closest to the working face in response to a voltage applied across said plate and the thermocouple leads.

11. The brake block of claim 10, in which the transmission of temperature and wear signals is conducted over a common pair of leads.

12. The brake block of claim 8, in which said erodible metallic plate is constructed of copper.

13. The brake block of claim 8, in which said alloy lead is constantan.

14. The brake block of claim 8, in which said friction element includes at least one edge that extends in a direction perpendicular to the direction of rotation of said brake drum braking face and wherein said erodible metallic plate is affixed to said one edge.

15. The brake block of claim 14, in which said metallic plate substantially overlies said one edge of said friction element.

16. The brake block of claim 8, in which said metallic plate is molded into said friction element.

17. The brake block of claim 16, in which said metallic plate is formed by stamping.

18. The brake block of claim 17, in which said metallic plate includes a plurality of laterally extending protrusions and said protrusions project into and are surrounded by said friction material.

19. The brake block of claim 8, in which said metallic plate is adhesively bonded to said friction element.

20. The brake block of claim 8, in which said metallic plate is affixed to said friction element by mechanical fasteners.

21. The brake block of claim 8, in which said metallic plate has a thickness of less than 0.100 inches.

22. A brake pad having a friction element with a friction face adapted to be moved into contact with a braking face of a rotor and an integral thermocouple for outputting a signal indicative alternatively of the steady state temperature of the brake pad friction element and of the transient temperature of the friction element-rotor interface which comprises;
   an erodible metallic plate forming one element of a junction of the thermocouple affixed to said brake pad;
   said plate having the same approximate depth as said friction element and having a working face parallel with said friction element friction face;
   wherein said working face is adapted to engage said rotor braking face when said brake pad friction element is moved into contact with said rotor such that said metallic plate erodes with said friction element in a direction perpendicular to said interface;
   said plate having a width substantially greater than its thickness and sufficient to ensure that a substantial portion of said working face engages said rotor braking face when said friction element is moved into contact with said rotor; and
   at least one alloy lead affixed to said plate to form the second element of said thermocouple junction.

23. The brake pad of claim 22, in which a plurality of alloy leads are affixed to said plate at spaced lateral distances from said working face to form a plurality of thermocouple junctions such that said plurality of junctions are destroyed sequentially as said plate erodes through contact with said braking face.

24. The brake pad of claim 23, in which a resistance is interposed between each of said alloy leads to provide an output current indicating the surviving thermocouple junction closest to the working face in response to a voltage applied across said plate and the thermocouple leads.

25. The brake block of claim 24, in which the transmission of temperature and wear signals is conducted over a common pair of leads.

26. The brake pad of claim 22, in which said erodible metallic plate is constructed of copper.

27. The brake pad of claim 22, in which said alloy lead is constantan.

28. The brake pad of claim 22, in which said friction element includes at least one edge that extends in a direction perpendicular to the direction of rotation of said rotor braking face and wherein said erodible metallic plate is affixed to said one edge.

29. The brake pad of claim 28, in which said metallic plate substantially overlies said one edge of said friction element.

30. The brake pad of claim 22, in which said metallic plate is molded into said friction element.

31. The brake pad of claim 30, in which said metallic plate is formed by stamping.

32. The brake pad of claim 31, in which said metallic plate includes a plurality of laterally extending protrusions and said protrusions project into and are surrounded by said friction material.

33. The brake pad of claim 22, in which said metallic plate is adhesively bonded to said friction element.

34. The brake pad of claim 22, in which said metallic plate is affixed to said friction element by mechanical fasteners.

35. The brake pad of claim 22, in which said metallic plate has a thickness of less than 0.100 inches.

* * * * *